(12) United States Patent
Galande et al.

(10) Patent No.: US 9,570,736 B2
(45) Date of Patent: Feb. 14, 2017

(54) ELECTRODES WITH THREE DIMENSIONAL CURRENT COLLECTORS AND METHODS OF MAKING THE SAME

(71) Applicant: William Marsh Rice University, Houston, TX (US)

(72) Inventors: Charudatta Galande, Houston, TX (US); Neelam Singh, Houston, TX (US); Suman Khatiwada, Houston, TX (US); Pulickel M. Ajayan, Houston, TX (US)

(73) Assignee: WILLIAM MARSH RICE UNIVERSITY, Houston, TX (US)

( * ) Notice: Subject to any disclaimer, the term of this patent is extended or adjusted under 35 U.S.C. 154(b) by 174 days.

(21) Appl. No.: 14/516,480

(22) Filed: Oct. 16, 2014

(65) Prior Publication Data

US 2015/0104714 A1 Apr. 16, 2015

Related U.S. Application Data

(60) Provisional application No. 61/891,604, filed on Oct. 16, 2013.

(51) Int. Cl.
*H01M 2/02* (2006.01)
*H01M 4/139* (2010.01)
(Continued)

(52) U.S. Cl.
CPC ............. *H01M 4/139* (2013.01); *H01G 11/28* (2013.01); *H01G 11/30* (2013.01); *H01G 11/70* (2013.01);
(Continued)

(58) Field of Classification Search
CPC ......... H01G 11/28; H01G 11/30; H01G 11/46; H01G 11/68; H01G 11/70; H01G 11/86; H01M 10/0525; H01M 4/0404; H01M 4/13; H01M 4/139; H01M 4/661; H01M 4/667; H01M 4/70; H01M 4/72; Y02E 60/122; Y02E 60/13
See application file for complete search history.

(56) References Cited

U.S. PATENT DOCUMENTS 6,926,997 B2   8/2005  Guidotti et al.
2002/0110733 A1   8/2002  Johnson
(Continued)

FOREIGN PATENT DOCUMENTS

EP          2270909 A1    1/2011
GB     EP 2270909 A1 *   1/2011   ............. H01M 6/40
WO   WO-2014007866 A2    1/2014

OTHER PUBLICATIONS

International Search Report and Written Opinion for PCT/US2013/032394, mailed Jan. 10, 2014.
(Continued)

*Primary Examiner* — Patrick Ryan
*Assistant Examiner* — Ben Lewis
(74) *Attorney, Agent, or Firm* — Winstead PC

(57) ABSTRACT

In some embodiments, the present disclosure pertains to methods of forming electrodes on a surface. In some embodiments, the formed electrodes have a three-dimensional current collector layer. In some embodiments, the present disclosure pertains to the formed electrodes. In some embodiments, the present disclosure pertains to energy storage devices that contain the formed electrodes.

30 Claims, 12 Drawing Sheets

(51) Int. Cl.
| | |
|---|---|
| H01M 4/72 | (2006.01) |
| H01M 4/04 | (2006.01) |
| H01M 4/13 | (2010.01) |
| H01M 4/70 | (2006.01) |
| H01G 11/28 | (2013.01) |
| H01G 11/30 | (2013.01) |
| H01G 11/70 | (2013.01) |
| H01G 11/86 | (2013.01) |
| H01M 10/0525 | (2010.01) |
| H01M 4/66 | (2006.01) |
| H01G 11/46 | (2013.01) |
| H01G 11/68 | (2013.01) |

(52) U.S. Cl.
CPC ........... *H01G 11/86* (2013.01); *H01M 4/0404* (2013.01); *H01M 4/13* (2013.01); *H01M 4/667* (2013.01); *H01M 4/70* (2013.01); *H01M 4/72* (2013.01); *H01G 11/46* (2013.01); *H01G 11/68* (2013.01); *H01M 4/661* (2013.01); *H01M 10/0525* (2013.01); *Y02E 60/122* (2013.01); *Y02E 60/13* (2013.01)

(56) References Cited

U.S. PATENT DOCUMENTS

| | | |
|---|---|---|
| 2008/0090138 A1 | 4/2008 | Vu et al. |
| 2008/0138696 A1 | 6/2008 | Bartling |
| 2008/0190841 A1 | 8/2008 | Pascaly et al. |
| 2009/0070989 A1 | 3/2009 | Pozin et al. |
| 2010/0203389 A1* | 8/2010 | Yoshida ................. C01B 25/45 429/224 |
| 2010/0330425 A1 | 12/2010 | Lopatin et al. |
| 2011/0104571 A1 | 5/2011 | Zhamu et al. |
| 2011/0143018 A1 | 6/2011 | Peng et al. |
| 2011/0165459 A1 | 7/2011 | Halalay et al. |
| 2011/0256450 A1 | 10/2011 | Campbell et al. |
| 2011/0274850 A1 | 11/2011 | Yang et al. |
| 2012/0009331 A1 | 1/2012 | Kwon et al. |
| 2012/0015232 A1 | 1/2012 | Teshima et al. |
| 2012/0045694 A1 | 2/2012 | Park et al. |
| 2012/0048729 A1 | 3/2012 | Mikhaylik et al. |
| 2015/0027615 A1 | 1/2015 | Singh et al. |
| 2015/0090607 A1 | 4/2015 | Galande et al. |

OTHER PUBLICATIONS

International Preliminary Report on Patentability for PCT/US2013/032394, mailed Sep. 25, 2014.
Singh et al., Paintable Battery, Scientific Reports 2, Article No. 481, 2012.
Singh, Fabrication of Li-ion batteries by multi-step spray painting, poster presented at the IDTechx Energy harvesting and Storage Conference, Nov. 7-8, 2012.
Singh, Fabrication of Li-ion batteries by multi-step spray painting, Power Point slides presented at the IDTechx Energy harvesting and Storage Conference, Nov. 7-8, 2012.
Singh, Paintable Li-ion Batteries, Power Point slides presented to Applied Materials on Jul. 6, 2012 (also presented to the Thin Film Users Group in Sep. 2012).
Historic Congressional Study: Corrosion Costs and Preventative Strategies in the United States, a Supplement to Materials Performance, NACE International, Houston TX (Jul. 2002).
Hu et al., Stretchable, Porous, and Conductive Energy Textiles. *Nano Letters* 10, 708 (2010).
Liu et al., Flexible, Solid Electrolyte-Based Lithium Battery Composed of LiFePO4 Cathode and Li4Ti5O12 Anode for Applications in Smart Textiles. Journal of the Electrochemical Society 159, A349 (2012).
Pushparaj et al., Flexible energy storage devices based on nanocomposite paper. Proceedings of the National Academy of Sciences of the United States of America 104, 13574 (2007).
Yang et al., Transparent lithium-ion batteries. *Proceedings of the National Academy of Sciences of the United States of America* 108, 13013 (2011).
Liangbing et al., Thin, Flexible Secondary Li-Ion Paper Batteries, ACS Nano, 2010, 4 (10), pp. 5843-5848.
Du Pasquier et al., Plastic PVDF-HFP electrolyte laminates prepared by a phase-inversion process, Solid State Ionics 135, 1-4 (2000).
Tarascon et al., Performance of Bellcore's plastic rechargeable Li-ion batteries, *Solid State Ionics*, 86-88, 49-54 (1996).
Nishide et al., Toward Flexible Batteries. *Science* 319, 737 (2008).
Hu et al., Thin, Flexible Secondary Li-Ion Paper Batteries. *Acs Nano* 4, 5843 (2010).
Jones et al., A Thin-Film Solid-State Microbattery. *Journal of Power Sources* 44, 505 (1993).
Harb et al., Microbatteries for self-sustained hybrid micropower supplies. *Journal of Power Sources* 104, 46 (2002).
Leonov et al., Wearable electronics self-powered by using human body heat: The state of the art and the perspective. *Journal of Renewable and Sustainable Energy* 1, (2009).
Scrosati et al., Lithium batteries: Status, prospects and future. *Journal of Power Sources* 195, 2419 (2010).
Kiebele et al., Carbon nanotube based battery architecture. *Applied Physics Letters* 91, (2007).
Zhang et al., Microporous gel electrolyte Li-ion battery. *Journal of Power Sources* 125, 114 (2004).
Genovese et al., Sun-Believable Solar Paint. A Transformative One-Step Approach for Designing Nanocrystalline Solar Cells. *Acs Nano* 6, 865 (2011).
Ahn et al., Development of high capacity, high rate lithium ion batteries utilizing metal fiber conductive additives. *Journal of Power Sources* 81-82, 896 (1999).

\* cited by examiner

ELECTRODES WITH THREE DIMENSIONAL CURRENT COLLECTORS AND METHODS OF MAKING THE SAME

CROSS-REFERENCE TO RELATED APPLICATIONS

This application claims priority to U.S. Provisional Patent Application No. 61/891,604, filed on Oct. 16, 2013. This application is related to PCT/US2013/032394, entitled "Methods of Making Multilayer Energy Storage Devices", filed on Mar. 15, 2013. The entirety of each of the aforementioned applications is incorporated herein by reference.

BACKGROUND

Current electrodes have limited power capacity and limited energy density. Furthermore, development of electrodes with higher power capacity and energy density may increase the thickness and bulkiness of electrodes. Therefore, a need exists for methods of making compact electrodes with high energy densities without significantly compromising their power capacities.

BRIEF SUMMARY

In some embodiments, the present disclosure pertains to methods of forming electrodes on a surface. In some embodiments, the methods comprise: (a) applying a first non-solid current collector composition above the surface to form a first current collector layer above the surface; (b) applying a first non-solid electrode composition above the first current collector layer to form a first electrode layer above the first current collector layer; (c) applying a second non-solid current collector composition above the first electrode layer to form a three-dimensional current collector layer above the first electrode layer; and (d) applying a second non-solid electrode composition above the three-dimensional current collector layer to form a second electrode layer above the three-dimensional current collector layer.

In some embodiments, steps (b)-(d) may be repeated multiple times to form multiple layers (e.g., multiple alternate electrode and current collector layers). In some embodiments, each of the individual steps may be repeated multiple times to form multiple layers above a surface or another layer.

In some embodiments, the methods of the present disclosure may also include one or more compaction steps, such as calendaring steps. In some embodiments, a compaction step occurs after applying the first non-solid electrode composition above the first current collector layer. In some embodiments, a compaction step occurs after applying the second non-solid current collector composition above the first electrode layer. In some embodiments, a compaction step occurs after applying a second non-solid electrode composition above the three-dimensional current collector layer.

In some embodiments, one or more of the applying steps are selected from the group consisting of spraying, brushing, rolling, printing, three-dimensional printing, and combinations thereof. In some embodiments, each of the applying steps comprises spraying.

In some embodiments, the three-dimensional current collector layer is formed above the first electrode layer by placing a stencil mask above the first electrode layer prior to applying the second non-solid current collector composition above the first electrode layer. In some embodiments, the applying of the second non-solid current collector composition above the first electrode layer comprises at least one of webbing, controlled spraying, controlled inkjet printing, three-dimensional printing, controlled screen printing, sputtering, e-beam evaporation, and combinations thereof.

In some embodiments, the first and second non-solid electrode compositions are anode electrode compositions that form anode electrode layers, and the first and second non-solid current collector compositions are anode current collector compositions that form anode current collector layers. In such embodiments, the methods of the present disclosure result in the formation of an anode with an embedded three dimensional current collector layer.

In some embodiments, the first and second non-solid electrode compositions are cathode electrode compositions that form cathode electrode layers, and the first and second non-solid current collector compositions are cathode current collector compositions that form cathode current collector layers. In such embodiments, the method results in the formation of a cathode with an embedded three-dimensional current collector layer.

In additional embodiments, the methods of the present disclosure pertain to forming an electrode on a surface, where the surface serves as a first current collector layer. In some embodiments, such methods include: (a) applying a first non-solid electrode composition above the surface to form a first electrode layer above the surface; (b) applying a second non-solid current collector composition above the first electrode layer to form a three-dimensional current collector layer above the first electrode layer; and (c) applying a second non-solid electrode composition above the three-dimensional current collector layer to form a second electrode layer above the three-dimensional current collector layer. In some embodiments, the surface may include a metal foil.

In further embodiments, the present disclosure pertains to electrodes that are formed by the methods of the present disclosure. In some embodiments, the formed electrodes of the present disclosure have an embedded three-dimensional current collector. In some embodiments, the formed electrodes of the present disclosure have reduced electrical resistance. In some embodiments, the formed electrodes of the present disclosure have reduced electrical resistance at the interface between the current collector layer and the electrode layer. In some embodiments, the formed electrodes of the present disclosure have reduced electrical resistance at the interface between the surface and the electrode layer.

In some embodiments, the formed electrodes of the present disclosure have reduced thermal resistance. In some embodiments, the formed electrodes of the present disclosure have reduced thermal resistance between an electrode layer and a three-dimensional current collector layer.

The electrodes formed by the methods of the present disclosure can have various applications. For instance, the formed electrodes may be used as components of a multilayer energy storage device. In some embodiments, the multilayer energy storage device may include, without limitation, capacitors, super capacitors, batteries, hybrids thereof, and combinations thereof. In some embodiments, the multilayer energy storage device is a lithium ion battery. In some embodiments, the present disclosure pertains to energy storage devices that contain the formed electrodes of the present disclosure.

BRIEF DESCRIPTION OF THE FIGURES

FIG. 2 shows schematics related to forming electrodes with embedded three-dimensional current collectors on a surface.

FIG. 3 shows schematics related to forming electrodes with three-dimensional current collector layers on a conducting surface, where surface works as a current collector layer.

FIG. 4 shows schematics related to the formation of negative and positive electrodes on a surface with embedded three-dimensional current collector layers.

DETAILED DESCRIPTION

It is to be understood that both the foregoing general description and the following detailed description are illustrative and explanatory, and are not restrictive of the subject matter, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that comprise more than one unit unless specifically stated otherwise.

The section headings used herein are for organizational purposes and are not to be construed as limiting the subject matter described. All documents, or portions of documents, cited in this application, including, but not limited to, patents, patent applications, articles, books, and treatises, are hereby expressly incorporated herein by reference in their entirety for any purpose. In the event that one or more of the incorporated literature and similar materials defines a term in a manner that contradicts the definition of that term in this application, this application controls.

Currently, energy storage devices (e.g., batteries) have a tradeoff between high energy density and high power density. For instance, batteries today are designed to be either "energy cells" or "power cells."

Briefly, energy storage devices (e.g., batteries) have "active components", which take part in the electrochemical reactions that lead to energy storage, and "inactive components" that do not take part in the electrochemical energy storage reactions. The active components include the "anode material", which takes part in the electrochemical reaction at the negative electrode, and the "cathode material", which takes part in the electrochemical reaction at the positive electrode. The inactive components include materials such as the polymeric binder, conducting additive, separator, current collectors, cell packaging and battery monitoring and management electronics.

Figure 1:
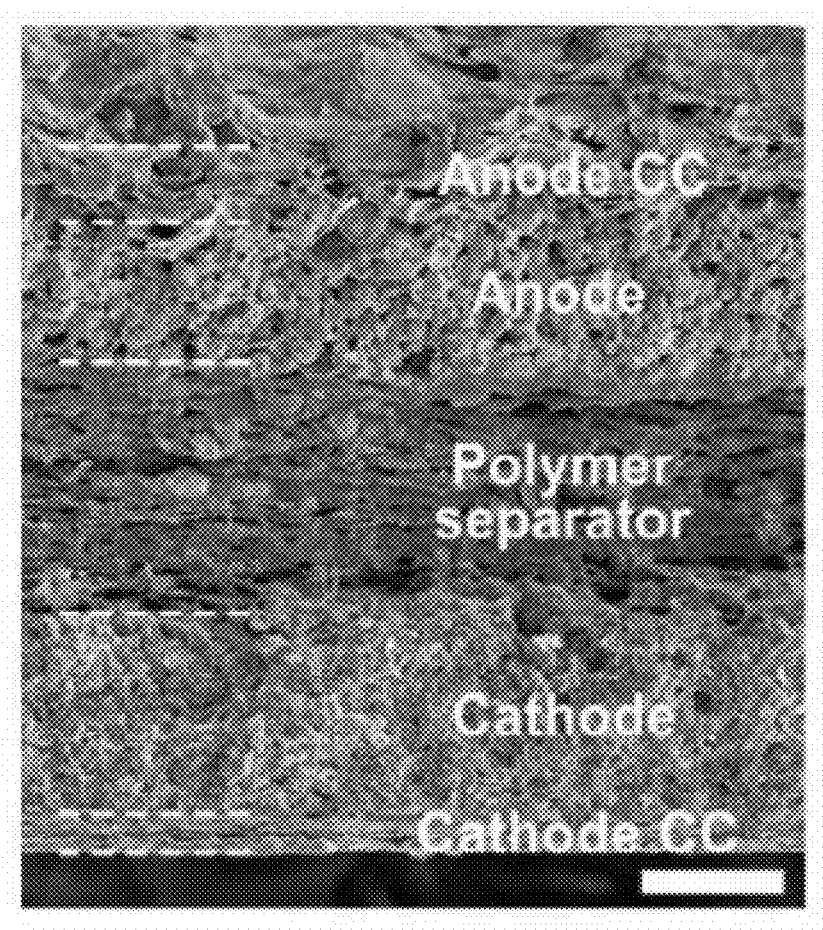
FIG. 1 provides a scanning electron micrograph of a cross-section of a spray-fabricated Li-ion cell (scale bar 100 microns).

For instance, the Scanning Electron Micrograph (SEM) image in FIG. 1 shows the cross-section of a spray-fabricated Li-ion cell composed of five layers: the cathode current collector, the cathode, the polymer separator, the anode and the anode current collector. Typically, the electrode layers are limited in thickness to about 60-100 microns. The two electrodes (cathode and anode materials) that store energy are the active components. The rest of the components—polymeric binders, polymer separator, current collectors, and external packaging—are the inactive components. Even though such inactive components may be required for correct operation, they do not typically contribute to the energy storage capacity of the battery.

Typically, the volumetric and gravimetric efficiencies of finished cells (measured in Wh/L and Wh/kg by total volume and total weight of a finished cell) are dependent on the proportion of the active components in the total volume and weight of the finished cell. It also follows that the larger the proportion of active components, the larger will be the volumetric and gravimetric efficiencies of the cell. This in turn makes it possible to pack larger amounts of energy in a given volume or weight. A larger proportion of the active material would also imply an increase in thickness of electrodes, which will give a greater areal capacity (measured in $mAh/cm^2$).

For instance, the energy density of energy storage cells (usually measured in Watt-hours per liter of packaged battery volume) is dependent on the mass fraction of the active components in the packaged cell (the active mass fraction). A higher active mass fraction increases the energy density of the electrochemical energy storage cell.

Likewise, the power density of energy storage cells (usually measured in Watts per liter of packaged battery volume) is dependent on factors such as the internal resistance of the cell. A lower internal resistance of the energy storage cell leads to a higher power density.

Another factor that affects the power density of the energy storage cell is the kinetics of the electrochemical reaction that is involved in energy storage. Faster reaction kinetics leads to a higher power density. Among the factors responsible for faster reaction kinetics are the type of electrode materials and compositions, particle size of active materials, and morphology of active materials. Some methods of increasing the power density of the electrochemical energy storage device involve increasing the rate of the chemical reactions involved in the electrochemical energy storage.

Among the factors that affect the internal resistance of the cell are the ohmic resistance of the battery components, ohmic resistance at the interfaces between components, ionic resistance of the ions in the electrolyte and the ionic resistance of the ions in the electrode. Some methods of increasing the power density of the energy storage device involve methods for achieving a reduction in one or more of the following: the ohmic resistance of the battery components, the ohmic resistance of the interfaces between the battery components, the ionic resistance of the electrolyte or the ionic resistance of the battery electrodes.

One method that may be used for increasing the active mass fraction in the energy storage device is increasing the thickness of the electrode layers in the battery. However, this increase in thickness of the electrode layers also leads to an increase in the ohmic resistance and ionic resistance of the electrode layers. This increase in the ohmic and ionic resistances negatively impacts the power density. This creates a tradeoff between the energy density and the power density of the electrochemical energy storage cell. For instance, a high energy density electrode will have a low power density and a high power density electrode will have a low energy density. Thus, electrochemical energy storage devices are designed and manufactured to be either "energy cells" with high energy density but low power density, or "power cells" with high power density but low energy density.

As such, an increase in thickness of electrodes may impact key performance parameters of the cell, such as the power performance. The above factors also create a fundamental tradeoff between the energy capacity and the power capacity of a cell, thereby constraining the performance envelope of the cell. As a result of this tradeoff, there exist two types of cells in the market: energy cells with high energy capacity, and power cells with high power capacity. In these cells, the typical areal capacity of the electrodes is 2-3 mAh/cm$^2$.

Figure 2A:
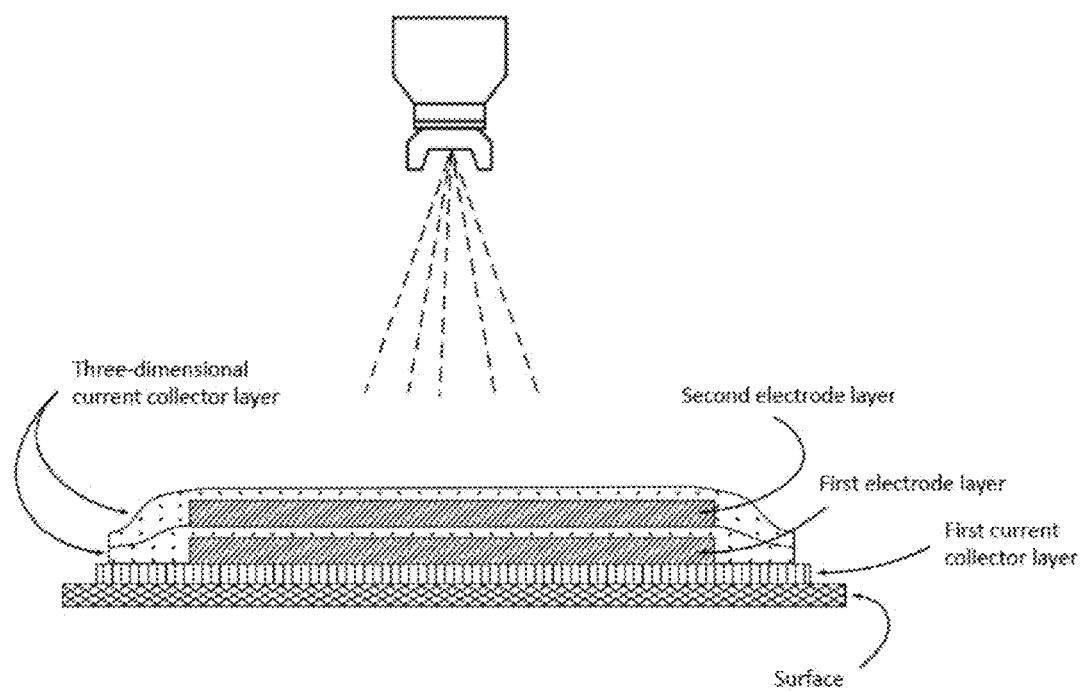
FIG. 2A shows a method of forming electrodes with embedded three dimensional current collectors on a surface.

In addition to this tradeoff, the thickness of electrodes achievable is further constrained by the manufacturing processes used to make the electrodes. Typically, a slurry of active materials, conducting additives and polymeric binders in a high-boiling solvent (typically N,N-dimethylpyrrolidine) is coated onto metal foils, which is then dried at elevated temperatures (FIG. 2A). In this process, a thicker coat of slurry is more difficult to dry correctly and the resultant film is more likely to crack during the drying process due to large shrinkage.

Thus, there exists a strong need for creating energy storage devices that have increased energy density without an equivalent sacrifice in the power density. Such energy storage devices would be of enormous importance for applications requiring large amounts of energy delivered at high power, but constrained by weight and volume limitations.

One approach that may be considered in order to affect an increase in power density is the use of three-dimensional current collectors for the electrode layers. In contrast to electrode layers in contact with planar current collectors composed of metallic foils, electrode layers in contact with three-dimensional current collectors would have a much larger interfacial area. This increase in interfacial area would effectively reduce the overall ohmic resistance of the electrode. This reduction in ohmic resistance of the electrode layers would in turn cause an increase in the power density of the electrochemical energy storage cell.

Examples of approaches that have been used to make three-dimensional current collectors involve use of metallic substrates comprising of nanoscale or micro-scale patterns produced by various patterning methods or by using etching. Such methods of producing three-dimensional current collectors are slow and expensive in comparison to other processes used in battery manufacturing. Thus, a need exists for ways of making three-dimensional current collectors that are scalable and compatible with standard roll-to-roll processes used for manufacturing batteries, without involving the use of slow and expensive methods such as micro-scale patterning or etching.

Applicants previously developed a method of fabricating Li-ion battery layers by a new process involving spraying of specifically designed slurries onto heated substrates (PCT/US2013/032394). By utilizing this process, Applicants were able to tailor the slurry compositions and drying conditions to yield a fast and reproducible way of making battery electrodes. This process had the distinct advantage of being scalable and highly cost-effective due to faster processing and overall reduction in the number of production lines required for scalable manufacturing.

An advantage of the above process is that the fast drying prevents cracking of electrodes and ensures good adhesion, thereby making it possible to fabricate much thicker electrodes without the associated problems of electrode cracking. Using the above process, it would be possible to increase the areal capacity of battery electrodes (e.g., in excess of 5 mAh/cm$^2$). For a typical cell, this would translate to a 30% increase in the energy density of the cell, as measured in Wh/L.

Although Applicants' new process described above solves the issues in manufacturing of thicker electrodes, the limitations in power capacity resulting from the increase in electrode thickness persist. Furthermore, it is envisioned that such limitations would be expected to become more severe due to the higher thicknesses expected.

Therefore, a need exists to devise a strategy to combat the reduction in power capacity of a cell. In particular, a need exists to combine high energy density (resulting from higher electrode thicknesses) and high power density in order to push the performance envelope of energy storage devices (e.g., batteries) beyond what is currently possible. The present disclosure addresses the above needs.

In some embodiments, the present disclosure relates to a set of designs and design principles for current collectors for use in multilayer energy storage devices, such as batteries (e.g., Li-ion batteries) and super capacitors. In some embodiments, the present disclosure pertains to methods of forming electrodes on a surface. In some embodiments, the method comprises: (a) applying a first non-solid current collector composition above the surface to form a first current collector layer above the surface; (b) applying a first non-solid electrode composition above the first current collector layer to form a first electrode layer above the first current collector layer; (c) applying a second non-solid current collector composition above the first electrode layer to form a three-dimensional current collector layer above the first electrode layer; and (d) applying a second non-solid electrode composition above the three-dimensional current collector layer to form a second electrode layer above the three-dimensional current collector layer. An embodiment of such a method of forming electrodes with embedded three-dimensional current collector layers on a surface is shown in FIG. 2A.

Figure 2B:
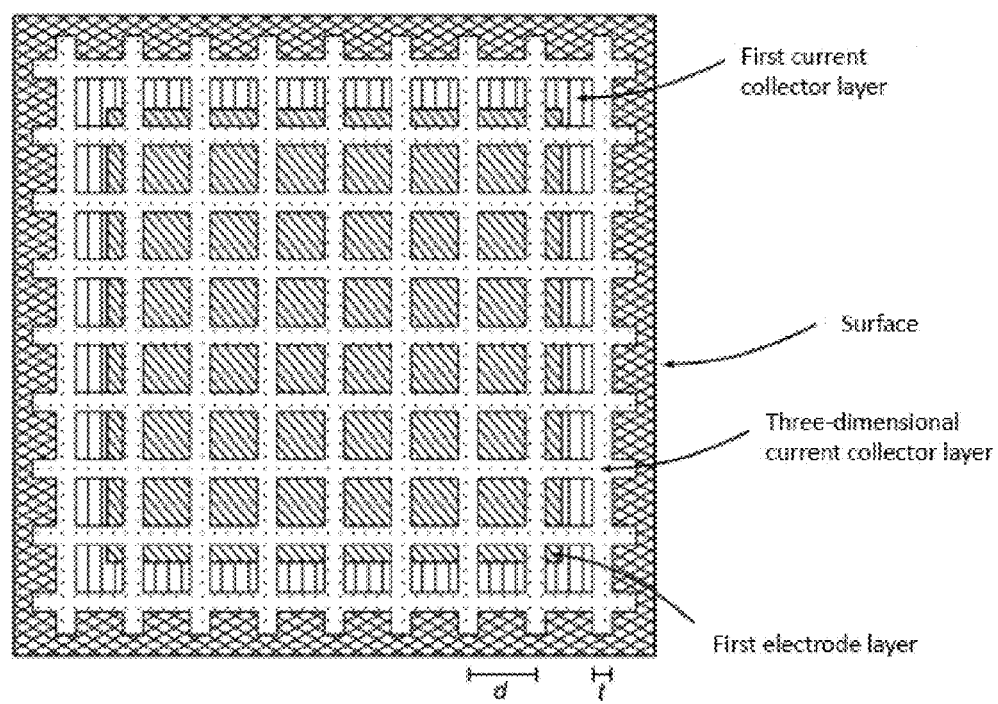
FIG. 2B shows a top view of arrangement of layers showing a three-dimensional current collector layer forming a web around the electrode layer formed on a surface. The distance between the lines 'd' and the width of the lines forming the three-dimensional current collector layer may be varied from 1 µm to 1 mm.
Figure 2C:
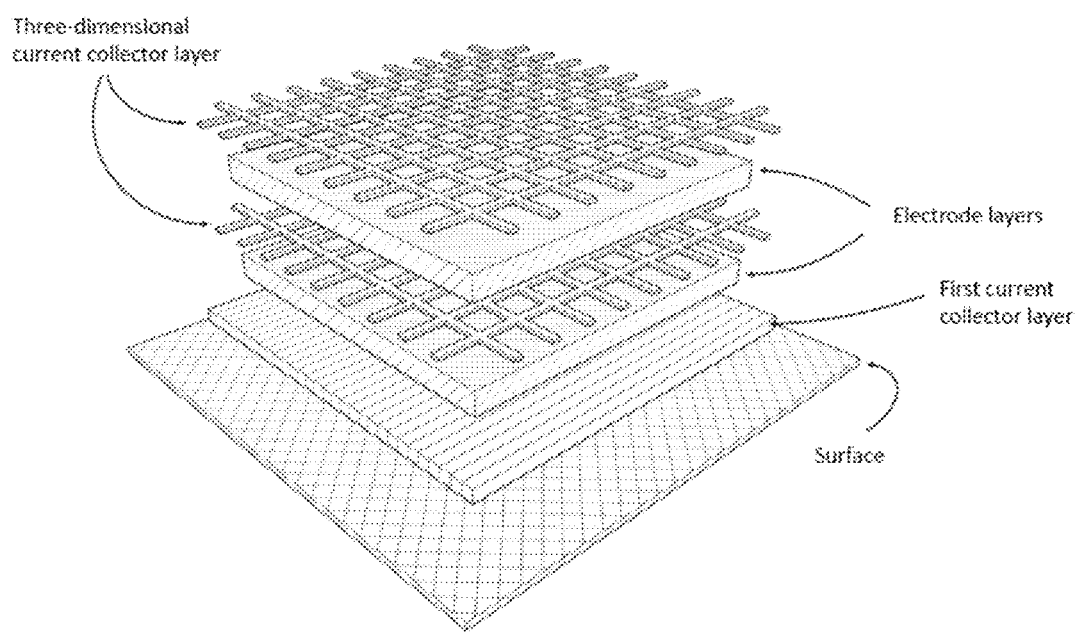
FIG. 2C shows a repeating arrangement of electrode layers and three-dimensional current collector layers in an electrode with embedded three dimensional current collectors formed on a surface.

In some embodiments, steps (b)-(d) may be repeated multiple times to form multiple layers (e.g., multiple pairs of layers, where each pair comprises an electrode layer and a current collector layer). An example of such an embodiment is shown in FIG. 2C.

Figure 5:
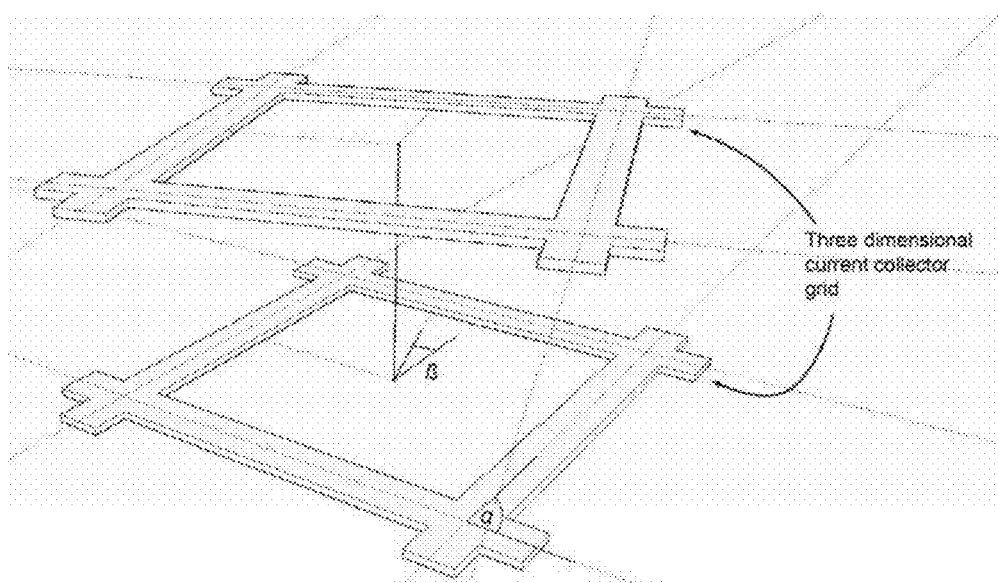
FIG. 5 shows that the angle 'α' of the connected lines in a web of a three-dimensional current collector layer may vary from 0 degrees to 90 degrees. Further, a three-dimensional current collector layer in the form of a web may be deposited at an angle 'β' relative to the previous three-dimensional current collector layer.
Figure 6:
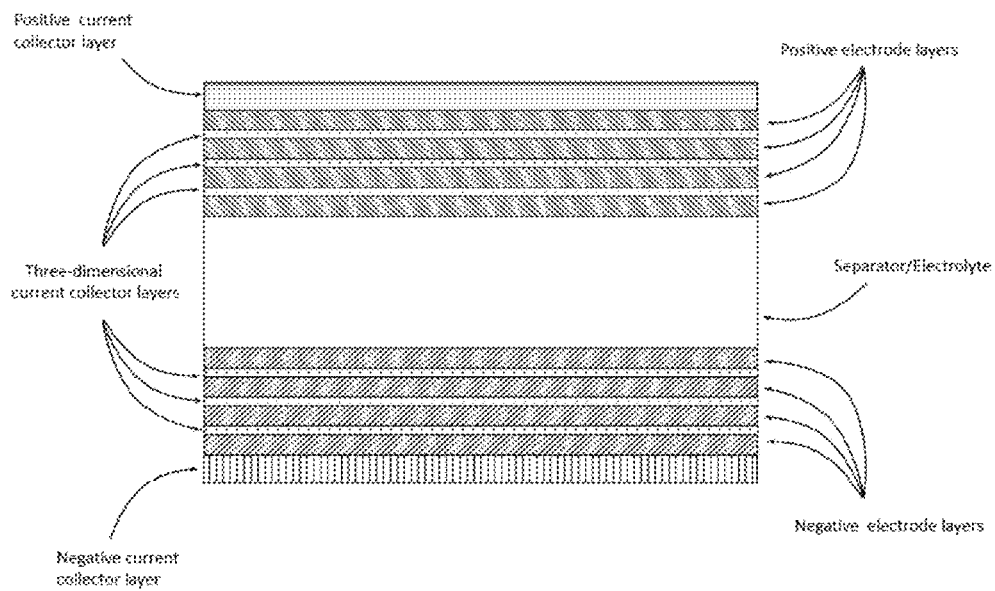
FIG. 6 shows a multi-layer electrochemical energy storage device with positive and negative electrodes embedded with three-dimensional current collector layers.

In some embodiments, the angle between the multiple layers (e.g., multiple layers 'β', as shown in FIG. 5) may be varied from approximately 0 degrees to 90 degrees. In some embodiments, each of the individual steps may be repeated multiple times to form multiple layers above a surface or another layer. In some embodiments, both positive and negative electrode layers of an electrochemical energy storage device may be formed with embedded three-dimensional current collector layers. An example of such an embodiment is shown in FIG. 6.

In additional embodiments, the methods of the present disclosure pertain to forming an electrode on a surface, where the surface serves as a first current collector layer. In some embodiments, such methods include: (a) applying a first non-solid electrode composition above the surface to form a first electrode layer above the surface; (b) applying a second non-solid current collector composition above the first electrode layer to form a three-dimensional current collector layer above the first electrode layer; and (c) applying a second non-solid electrode composition above the three-dimensional current collector layer to form a second electrode layer above the three-dimensional current collector layer. In some embodiments, the surface may include a metal foil.

Figure 3A:
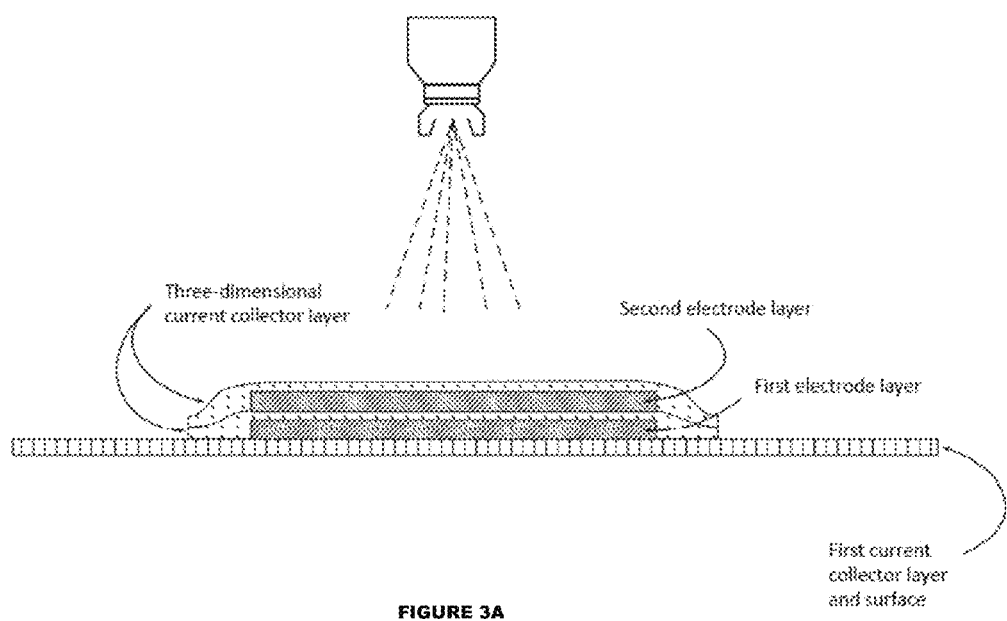
FIG. 3A shows a method of forming electrodes with embedded-three dimensional current collectors on a conducting surface.
Figure 3B:
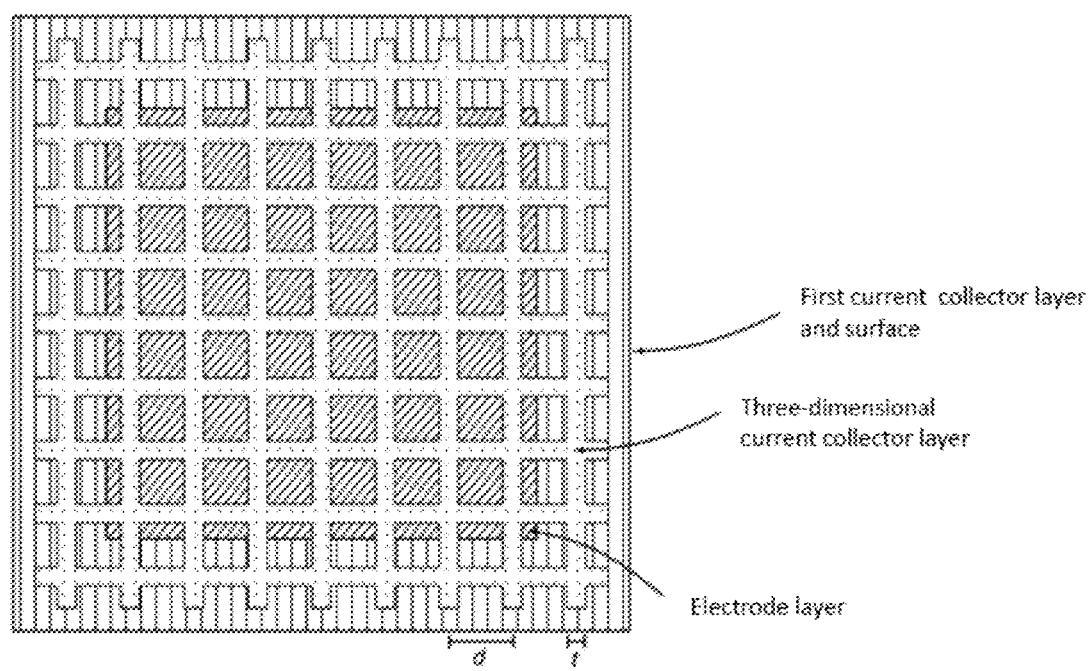
FIG. 3B shows a top view of an arrangement of layers showing a three-dimensional current collector layer forming a web around the electrode layer formed on a conducting surface. The distance between the lines 'd' and the width of the lines forming the three-dimensional current collector layer may be varied from 1 µm to 1 mm.
Figure 3C:
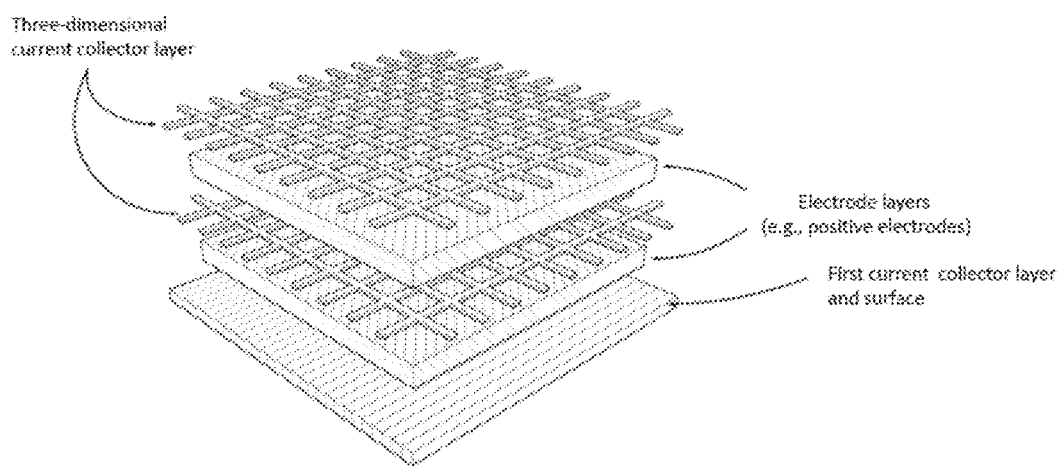
FIG. 3C shows a repeating arrangement of electrode layers and three-dimensional current collector layers in an electrode with embedded three-dimensional current collector layers formed on a conducting surface.
Figure 4A:
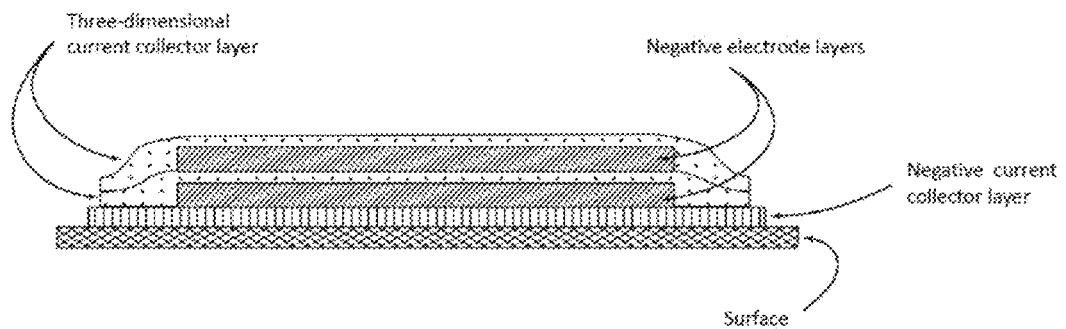
FIG. 4A shows formation of a negative electrode on a surface with an embedded three-dimensional current collector layer.
Figure 4B:
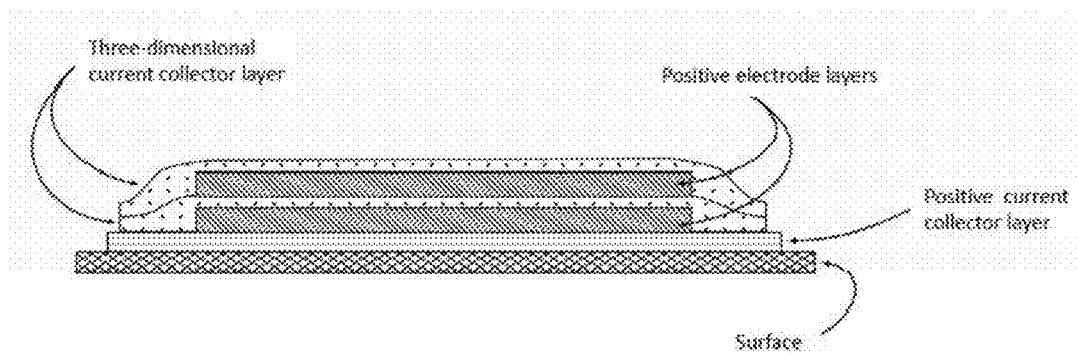
FIG. 4B shows formation of a positive electrode on a surface with an embedded three-dimensional current collector layer.

An example of the aforementioned embodiment of forming electrodes with embedded three-dimensional current collector layers on a surface is shown in FIG. 3A. In some embodiments, steps (a)-(c) may be repeated multiple times to form multiple layers (e.g., multiple alternate electrode and current collector layers). An example of such an embodiment is shown in FIG. 3C. In some embodiments, the angle between the multiple layers (e.g., multiple layers 'β' as shown in FIG. 5) may be varied from approximately 0 degrees to 90 degrees. In some embodiments, each of the individual steps may be repeated multiple times to form multiple layers above a surface or another layer.

In further embodiments, the present disclosure pertains to electrodes that are formed by the methods of the present disclosure. In additional embodiments, the present disclosure pertains to energy storage devices that contain the electrodes of the present disclosure. As set forth in more detail herein, the methods of forming the electrodes of the present disclosure can have numerous variations.

Compositions

The methods of the present disclosure can utilize various types of current collector compositions and electrode compositions (i.e., anode or cathode compositions) to form electrodes. In some embodiments, the compositions of the present disclosure may be in solid form. In some embodiments, the compositions of the present disclosure may be in non-solid form before an application step, such as in liquid form. Thereafter, the compositions may form one or more solid layers that become part of an electrode.

In some embodiments, the non-solid compositions may be in liquid form, such as in the form of sols, gels, liquid emulsions, liquid dispersions, and combinations thereof. In some embodiments, the non-solid compositions may be in the form of an emulsion. In some embodiments, the non-solid compositions may be in the form of a sol (i.e., liquid dispersion). In some embodiments, the non-solid compositions may be in the form of gels. In some embodiments, the non-solid compositions may be in the form of paints, such as conductive paints. In some embodiments, a pre-fabricated mesh of conducting materials such as copper or carbon fibers might be used instead of conductive paints.

Current Collector Compositions

Current collector compositions generally refer to compositions that form an electrically conducting current collector layer. In various embodiments, the current collector layers can be in contact with the respective electrode layers and capable of collecting current from the electrode layer, or supplying current to the electrode layer. In some embodiments, the current collector compositions of the present disclosure may be in solid form, such as in the form of a flexible foil that serves as an anode current collector. In some embodiments, the current collector compositions of the present disclosure may be in non-solid form, as previously described (e.g., liquid dispersions and liquid emulsions).

In some embodiments, the current collector compositions of the present disclosure may be cathode current collector compositions that can collect current from or supply current to a cathode electrode. In some embodiments, the cathode current collector compositions may include, without limitation, aluminum, iron, gold, silver, carbon nanotubes, graphene, conducting polymers, and combinations thereof. In more specific embodiments, the cathode current collector compositions may include carbon nanotubes, such as single-walled carbon nanotubes (SWNTs), double-walled carbon nanotubes, multi-walled carbon nanotubes, ultra-short carbon nanotubes, functionalized carbon nanotubes, unfunctionalized carbon nanotubes, pristine carbon nanotubes, doped carbon nanotubes, and combinations thereof.

In some embodiments, the current collector compositions of the present disclosure may be anode current collector compositions that can collect current from or supply current to an anode electrode. In some embodiments, the anode current collector compositions may include, without limitation, copper, nickel, titanium, and combinations thereof.

In various embodiments, the current collector compositions of the present disclosure may also include additional materials. Such materials may include, without limitation, solvents, conductive nanomaterials, surfactants, and combinations thereof.

For instance, in some embodiments, the current collector compositions of the present disclosure may include, without limitation, one or more solvents, such as N-methylpyrrolidone (NMP), N,N-Dimethylformamaide (DMF), acetone, propanol, ethanol, methanol, water, and combinations thereof. Likewise, in some embodiments, the current collector compositions of the present disclosure may include one or more conductive nanomaterials, such as conductive nanoparticles, conductive micro particles, conductive nanowires, carbon nanotubes, carbon blacks, graphite (e.g., ultrafine graphite or UFG), carbon fibers, and combinations thereof. In some embodiments, the current collector compositions of the present disclosure may include one or more surfactants, such as sodium dodecyl sulfate (SDS), dodecylbenzenesulphonate (SDBS), dodecyltrimethylammonium bromide (DTAB), triton-x, and combinations thereof.

In more specific embodiments, the current collector compositions of the present disclosure may include a cathode current collector composition containing purified HiPCO SWNTs, carbon black (e.g., Super P™), and NMP. In further embodiments, the current collector compositions of the present disclosure may include an anode current collector composition containing copper conductive paint.

The current collector compositions of the present disclosure can be prepared by various methods. For instance, in some embodiments, current collector paints may be prepared by dispersing conductive powders (e.g., Cu or Ti powders for the anode current collector compositions and Cr or Al for the cathode current collector compositions) and nanomaterials (e.g. metallic nanoparticles or micro particles, metallic nanowires, single-walled or multi-walled carbon nanotubes) in water or organic solvents (e.g., DMF, ethanol, NMP, etc.) in the presence of surfactants (e.g., SDS, SDBS, triton, etc.). Additional methods by which to make current collector compositions can also be envisioned.

In some embodiments, current collector compositions of the present disclosure can be extended with conductive terminals. In some embodiments, the extensions can be done by attaching Al or Ni tabs, or by gluing. In more specific embodiments, the current collector compositions of the present disclosure may be composed of electrically conducting materials, such as metal powders, metal nanowires, conducting polymers, carbon nanotubes dispersed in an appropriate solvent, and the like.

In some embodiments, an appropriate current collector composition may be chosen based on the polarity of the electrode, chemical stability at operating voltages, compatibility with electrolytes, and other similar parameters. In some embodiments, stabilizing agents or other additives may be added to the current collector compositions to improve the processability of the dispersion and electrical and mechanical properties of the formed layers. In some embodiments, commercially available conducting paints can also be used as components of current collector compositions.

Electrode Compositions

Electrode compositions generally refer to compositions that, when applied in the form of a layer, can serve as negative or positive electrodes (also known as anodes or cathodes). In some embodiments, the electrode compositions of the present disclosure may include a cathode electrode composition. In some embodiments, the cathode electrode composition may include, without limitation, lithium cobalt oxide ($LiCoO_2$), lithium manganese oxide ($LiMn_2O_4$), lithium iron phosphate ($LiFePO_4$), vanadium oxide ($VO_2$), lithium nickel manganese cobalt oxide (NMC), lithium nickel cobalt aluminum oxide (NCA), and combinations of thereof.

In some embodiments, the electrode compositions of the present disclosure may include an anode electrode composition. In some embodiments, the anode electrode compositions may include, without limitation, at least one of graphite (e.g. natural or synthetic graphite), carbon materials, lithium titanium oxide ($Li_4Ti_5O_{12}$), silicon (Si), graphene, molybdenum sulfides, titanium oxide, tin (Sn), tin oxide, nitrides, and combinations thereof.

In various embodiments, the electrode compositions of the present disclosure may also include additional materials, including, but not limited to polymers, solvents, conductive nanomaterials, and combinations thereof. For instance, in some embodiments, the electrode compositions of the present disclosure may include one or more polymers, such as poly(vinylidene fluoride) (PVDF), poly(methyl methacrylate) (PMMA), sodium carboxymethyl cellulose (CMC-Na), poly(tetrafluoroethylene) (PTFE), poly(vinyl acetate) (PVA), poly(vinylpyrrolidones) (PVP), polyacrylonitrile (PAN), polyethylene oxide (PEO), gelatin, Kynarflex™, polyimides, polyanilines, and combinations thereof.

Likewise, in some embodiments, the electrode compositions of the present disclosure may include, without limitation, one or more solvents, such as N-methylpyrrolidone (NMP), N,N-Dimethylformamaide (DMF), acetone, propanol, ethanol, methanol, water, and combinations thereof. In some embodiments, the electrode compositions of the present disclosure may include one or more conductive nanomaterials, such as conductive nanoparticles, conductive micro particles, conductive nanowires, carbon nanotubes, carbon blacks, graphite, carbon fibers, and combinations thereof.

In more specific embodiments, the electrode compositions of the present disclosure may include cathode electrode compositions containing $LiCoO_2$, carbon black (e.g., Super P™), UFG, and PVDF in NMP. In further embodiments, the electrode compositions of the present disclosure may include anode electrode compositions containing $Li_4Ti_5O_{12}$, UFG, and PVDF in NMP. Furthermore, various methods may be utilized to make the electrode compositions of the present disclosure.

Surfaces

The compositions of the present disclosure may be applied above various surfaces in order to form electrodes on those surfaces. For instance, in some embodiments, the surfaces may include, without limitation, glasses, fabrics, metals, plastics, ceramics, and combinations thereof.

In more specific embodiments, the surfaces may be metallic surfaces. In some embodiments, the surface may be chemically cleaned before an application step. In some embodiments, the surface may be heated before or during an application step. For instance, in some embodiments, the surface may be heated from about 50° C. to about 200° C. before an application step. In some embodiments, the surface may be heated from about 50° C. to about 150° C. before an application step. In some embodiments, the surface may be at room temperature during an application step.

Furthermore, the surfaces of the present disclosure may have various shapes and sizes. In some embodiments, the surfaces may be in the form of circles, ovals, triangles, squares, rectangles, and other shapes. In some embodiments, the surfaces may be flat. In some embodiments, the surfaces may be curved. In some embodiments, the surfaces may have a pre-defined shape that is conferred by a mold or a cast.

Layer Formation

Various methods may be used to form individual layers from the compositions of the present disclosure. In some embodiments, layers may form by applying respective compositions above a surface or another layer. Various methods may be used for such application steps. Exemplary application methods may include, without limitation, spraying, painting, brushing, rolling, printing, three-dimensional printing, thermal spraying, cold spraying and combinations of such methods.

In some embodiments, the applying may occur by spraying respective compositions above a surface or another layer. In some embodiments, the spraying may include, without limitation, ultrasonic spraying, thermal spraying, electrostatic spraying, and combinations thereof.

In some embodiments, the applying may occur by printing respective compositions above a surface or another layer. In some embodiments, the printing may include, without limitation, three-dimensional printing, inkjet printing, screen printing, and combinations thereof.

In more specific embodiments, the applying may occur by spray painting techniques, such as spray painting compositions from aerosol cans, spray guns, or air brushes. In some embodiments, the applying of a layer may be followed by hot or cold roll pressing of the layer one or more times to achieve a higher degree of compaction. In some embodiments where a composition is in solid form, the applying step may include placing the solid composition above another layer by various mechanical methods.

In some embodiments, the steps of the present disclosure may be repeated multiple times to form electrodes that are stacked as shown in FIG. 2C and FIG. 3C. Furthermore, each layer of a formed electrode may be composed of a single layer or multiple sub-layers. For instance, in some embodiments, a composition can be applied above a surface or another layer multiple times to form a plurality of layers above the surface or the other layer. In other embodiments, a composition can be applied above a surface or another layer once to form a single layer above the surface or the other layer.

In some embodiments, the individual applying steps may be repeated multiple times to form multiple individual layers. For instance, in some embodiments, a first non-solid current collector composition is applied above a surface multiple times to form a plurality of first current collector layers above the surface. In some embodiments, a first non-solid electrode composition is applied above a first current collector layer or a surface that serves as a current collector layer multiple times to form a plurality of first electrode layers above the first current collector layer or surface. In some embodiments, a second non-solid current collector composition is applied above a first electrode layer multiple times to form a plurality of three-dimensional current collector layers above the first electrode layer. In some embodiments, a second non-solid electrode composition is applied above a three-dimensional current collector layer multiple times to form a plurality of second electrode layers above the three-dimensional current collector layer.

In some embodiments, the compositions that are applied multiple times may be the same compositions. In some embodiments, the compositions that are applied multiple times may include one or more different compositions.

Furthermore, the formed layers of the present disclosure can have various thicknesses. For instance, in some embodiments, a formed layer may have a thickness that ranges from about 0.1 μm to about 1 mm. In some embodiments, a formed layer may have a thickness that ranges from about 1 μm to about 500 μm. In some embodiments, a formed layer may have a thickness of about 200 μm.

The formed layers may also have various shapes and sizes. In some embodiments, the layers may be in the form of circles, ovals, triangles, squares, rectangles, and other shapes. In some embodiments, the formed layers may have a pre-defined shape that is conferred by a mold or a cast. For instance, layers with desired shapes may be achieved by using a stencil or shadow mask. In some embodiments, layers with desired shapes may be achieved by the use of precisely defined movements of a robotic device, such as a robotic manipulator or arm. In some embodiments, the desired shapes may be achieved by using printing methods. In some embodiments, the printing methods may include, without limitation, three-dimensional printing, inkjet printing, screen printing, and combinations thereof.

Furthermore, the layers of the present disclosure may be derived from various types of compositions. In particular, various current collector compositions, electrode compositions, and electrically insulating compositions may be utilized to form the individual layers.

Three-Dimensional Current Collector Layer Formation

Various methods may also be used to form three-dimensional current collector layers. In some embodiments, three-dimensional current collector layers are formed above a first electrode layer by placing a stencil mask above a first electrode layer prior to applying a second non-solid current collector composition above the first electrode layer. In some embodiments, the stencil mask is a stenciled metal layer, such as a stenciled copper interlayer. In some embodiments, the stencil mask is a stenciled carbon nanotube interlayer.

In some embodiments, one or more three-dimensional current collector layers are formed above a first electrode layer by applying a second non-solid current collector composition above the first electrode layer through various applications methods that were described previously. In some embodiments, the application methods may include, without limitation, webbing, controlled spraying, controlled inkjet printing, three-dimensional printing, controlled screen printing, sputtering, e-beam evaporation, thermal evaporation, and combinations thereof. In more specific embodiments, the current collector compositions of the present disclosure may be sprayed onto a first electrode layer in the form of a web (FIG. 2B and FIG. 3B) by use of a stencil mask, controlled motion of a robotic arm, inkjet printing head, screen printing, three-dimensional printing and combinations thereof.

In some embodiments, the dimensions of a three-dimensional current collector may be varied. For instance, FIG. 2B and FIG. 3B show the distance between the conducting lines 'd' and the width of the lines between the conducting lines 'd' and the width of the lines 't' of the three-dimensional current collectors. In some embodiments, 'd' may be varied from 0.1 micron to 1 mm. In some embodiments, 't' may be varied from 0.1 micron to 1 mm. In some embodiments, the angle of the gird 'α' (as shown in FIG. 5) may be varied from approximately 0 degrees to 90 degrees.

Compaction Steps

In some embodiments, the methods of the present disclosure may also include one or more compaction steps. In some embodiments, a compaction step occurs after applying a first non-solid electrode composition above a first current collector layer or a surface that serves as the first current collector layer. In some embodiments, a compaction step occurs after applying a second non-solid current collector composition above a first electrode layer. In some embodiments, a compaction step occurs after applying a second non-solid electrode composition above a three-dimensional current collector layer. In some embodiments, the one or more compaction steps may occur by calendaring.

Post-Processing Steps

Additional embodiments of the present disclosure may also include a step of activating the formed electrodes. For instance, in some embodiments, the activating may include an addition of an electrolyte to the formed electrodes. In some embodiments, the added electrolyte may include, without limitation, $LiPF_6$, $LiBF_4$, $LiClO_4$, $LiNO_3$, ethylene carbonate, di-methyl carbonate, propylene carbonate, water, lithium ion conducting room temperature ionic liquids, and combinations thereof. In some embodiments, the activated electrode may be sealed in a pouch (e.g., laminated aluminum foil or equivalent container) after electrolyte exposure. In some embodiments, the sealing may occur inside a glove box or other controlled environment.

Further embodiments of the present disclosure may also include a step of drying the formed electrodes. For instance, in some embodiments, the drying may occur in a vacuum. In some embodiments, the drying may occur in an oven or a heated environment. In some embodiments, the drying may occur by blow drying, such as blow drying with compressed air or with hot air.

Variations

The methods of the present disclosure have numerous variations. For instance, in some embodiments, the first and second non-solid electrode compositions are anode electrode compositions that form anode electrode layers, and the first and second non-solid current collector compositions are anode current collector compositions that form anode current collector layers. In such embodiments, the methods of the present disclosure result in the formation of an anode with an embedded three-dimensional current collector layer.

In some embodiments, the first and second non-solid electrode compositions are cathode electrode compositions that form cathode electrode layers, and the first and second non-solid current collector compositions are cathode current collector compositions that form cathode current collector layers. In such embodiments, the method results in the formation of a cathode with an embedded three-dimensional current collector layer.

In some embodiments, the first and second non-solid electrode compositions are anode electrode compositions that form anode electrode layers, a surface serves as an anode current collector layer, and the second non-solid current collector composition is an anode current collector composition that forms an anode current collector layer. In such embodiments, the method results in the formation of an anode with an embedded three-dimensional current collector layer.

In some embodiments, the first and second non-solid electrode compositions are cathode electrode compositions that form cathode electrode layers, a surface serves as a cathode current collector layer, and the second non-solid current collector composition is a cathode current collector composition that forms a cathode current collector layer. In such embodiments, the method results in the formation of a cathode with an embedded three-dimensional current collector layer.

In some embodiments, the first and second non-solid current collector compositions have the same compositions. In such embodiments, the first current collector layer and the three-dimensional current collector layer may also have the same compositions. In some embodiments, the first and second non-solid current collector compositions have different compositions. In such embodiments, the first current collector layer and the three-dimensional current collector layer may also have different compositions.

In some embodiments, the first and second non-solid electrode compositions have the same compositions. In such embodiments, the first and second electrode layers may also have the same compositions. In some embodiments, the first and second non-solid electrode compositions have different compositions. In such embodiments, the first and second electrode layers may also have different compositions.

Formed Electrodes

The methods of the present disclosure can be utilized to make various types of electrodes. In some embodiments, the formed electrodes of the present disclosure have an embedded three-dimensional current collector. In some embodiments, the formed electrodes of the present disclosure have a three-dimensional structure. In some embodiments, the formed electrodes are anodes. In some embodiments, the formed electrodes are cathodes. In some embodiments, the formed electrodes may include a first current collector layer, a first electrode layer above the first current collector layer, a three-dimensional current collector layer above the first electrode layer, and a second electrode layer above the three-dimensional current collector layer.

The three-dimensional current collector layers of the present disclosure can have various structures. In some embodiments, the three-dimensional current collector layer has a non-planar structure. In some embodiments, the three-dimensional current collector layer surrounds the first current collector layer (or a surface that serves as the first current collector layer), the first electrode layer, and the second electrode layer. In some embodiments, the three-dimensional current collector layer forms a web around the first current collector layer (or a surface that serves as the first current collector layer), the first electrode layer, and the second electrode layer. In some embodiments, the three-dimensional current collector layer forms a grid around the first current collector layer (or a surface that serves as the first current collector layer), the first electrode layer, and the second electrode layer. In some embodiments, the three-dimensional current collector layer becomes an integral part of the formed electrode. In some embodiments, the three-dimensional current collector layer becomes intertwined with the first current collector layer (or a surface that serves as the first current collector layer), the first electrode layer, and the second electrode layer.

In some embodiments, the three-dimensional current collector layer forms interlayers that are connected to each other and to the first current collector layer (or a surface that serves as the first current collector layer) (FIG. 2A and FIG. 3A). In some embodiments, the electrodes of the present disclosure have a webbed or grid design, where the three-dimensional current collector forms an interlayer. In some embodiments, the interlayer can allow for a more facile motion of ions (FIG. 2B and FIG. 3B). In some embodiments, every particle of an electrode throughout its thickness is in close proximity to an element of a webbed three-dimensional current collector interlayer.

Energy Storage Devices

In some embodiments, the present disclosure pertains to energy storage devices that contain the formed electrodes of the present disclosure. In some embodiments, the energy storage device is a battery, such as a lithium ion battery. In some embodiments, the energy storage device may include, without limitation, capacitors, super capacitors, batteries, hybrids thereof, and combinations thereof.

Applications and Advantages

In some embodiments, the present disclosure is a new concept in electrode architecture that is related to Applicants' recent work in PCT/US2013/032394. In some embodiments, three-dimensional current collector layers can be developed by simple spray painting without involving any complex lithography techniques. Therefore, the methods of the present disclosure provide economical, facile and scalable methods of forming electrodes.

Furthermore, Applicants envision that the electrodes of the present disclosure can provide numerous advantageous properties. For instance, in some embodiments, the formed electrodes of the present disclosure have reduced electrical resistance. In some embodiments, the formed electrodes of the present disclosure have reduced electrical resistance at the interface between the current collector layer and the electrode layer. In some embodiments, the formed electrodes of the present disclosure have reduced electrical resistance at the interface between the surface and the electrode layer.

In some embodiments, the formed electrodes of the present disclosure have reduced thermal resistance. In some embodiments, the formed electrodes of the present disclosure have reduced thermal resistance between an electrode layer and a three-dimensional current collector layer.

In some embodiments, the three-dimensional electrodes of the present disclosure can reduce the ESR (equivalent series resistance), a key parameter to determining the overall performance of various energy storage devices, such as super capacitors. Similarly, Applicants envision that the net ohmic resistance of the electrodes of the present disclosure will be drastically reduced in various energy storage devices. This reduction in ohmic resistance of the electrodes of the present disclosure is expected to significantly benefit the rate performance (power capacity) of the electrodes. Applicants also envision that the electrodes of the present disclosure will have enhanced ionic conductance.

Figure 7:
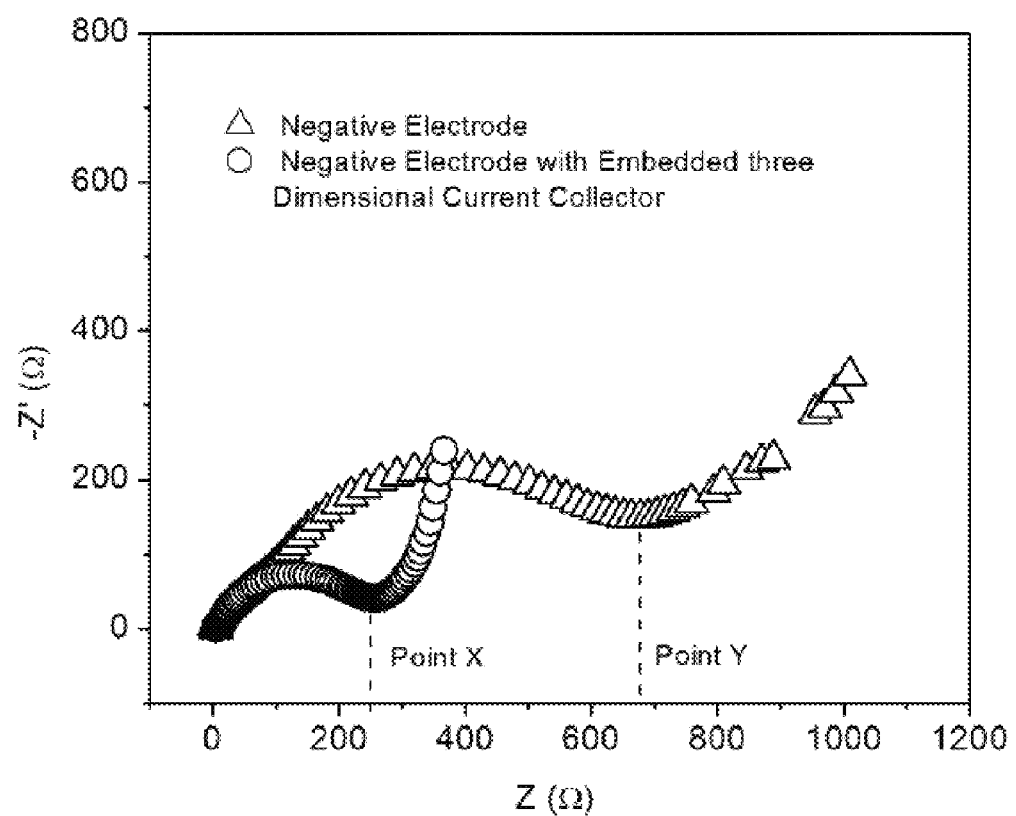
FIG. 7 shows the electrochemical impedance spectrum of an exemplary negative electrode with embedded three-dimensional current collector layer in comparison to the impedance spectrum of an exemplary negative electrode without an embedded three-dimensional current collector layer.

For instance, FIG. 7 shows the electrochemical impedance spectrum of an exemplary negative electrode with an embedded three-dimensional current collector layer in comparison to the impedance spectrum of an exemplary negative electrode without an embedded three-dimensional current collector layer. Applicants observed that the electrochemical series resistance of the electrode with an embedded three-dimensional current collector layer is lower than that of the electrode without an embedded three-dimensional current collector layer. The capacity of both electrodes was 9 mAh/cm$^2$.

Accordingly, Applicants envision numerous applications for the electrodes of the present disclosure. For instance, in some embodiments, the electrodes of the present disclosure may be used as components of a multilayer energy storage device. In some embodiments, the multilayer energy storage device may include, without limitation, capacitors, super capacitors, batteries, hybrids thereof, and combinations thereof. In some embodiments, the multilayer energy storage device is a lithium ion battery. Applicants also envision the utilization of the electrodes of the present disclosure in developing low-cost, high-energy and high-power batteries-a desirable requirement for widespread adoption of electric vehicles.

Additional Embodiments

Reference will now be made to more specific embodiments of the present disclosure and experimental results that provide support for such embodiments. However, Applicants note that the disclosure below is for illustrative purposes only and is not intended to limit the scope of the claimed subject matter in any way.

Example 1

Preparation of Paints

Preparation of paints: The slurries or "paints" of electrode materials, current collector materials and polymeric separator materials are prepared. For a detailed description of general principles of preparing such paints for spray-fabrication, please refer to: PCT/US2013/032394 and N. Singh et. al, Scientific Reports 2, Article number: 481 (http://www.nature.com/srep/2012/120628/srep00481/full/srep00481.html)

Example 2

Fabrication of Electrodes

Step A. The current collector layer is first deposited by spraying the current collector paint upon an appropriate substrate heated to temperatures between 50° C. and 150° C. Alternatively, an appropriate metal foil is used as a substrate and as a current collector.

Step B. The electrode paint is sprayed upon the current collector layer at a controlled rate to achieve a desired thickness.

Step C. A calendaring (compaction) step may be performed at this stage. This step is optional.

Step D. An appropriate current collector paint is then spray deposited in the form of a webbing (FIG. 2B, FIG. 3B and FIG. 5) by use of a stencil mask or controlled motion of a robotic arm or inkjet printing head, or by screen printing.

Step E. A calendaring (compaction) step may be performed at this stage. This step is also optional.

Step F. The electrode paint is spray deposited similar to step b. In such fashion, steps b-e may be repeated for a desired number of times.

Step G. Optionally, a final calendaring step may be performed to finish the electrode fabrication.

Without further elaboration, it is believed that one skilled in the art can, using the description herein, utilize the present disclosure to its fullest extent. The embodiments described herein are to be construed as illustrative and not as constraining the remainder of the disclosure in any way whatsoever. While the embodiments have been shown and described, many variations and modifications thereof can be made by one skilled in the art without departing from the spirit and teachings of the invention. Accordingly, the scope of protection is not limited by the description set out above, but is only limited by the claims, including all equivalents of the subject matter of the claims. The disclosures of all patents, patent applications and publications cited herein are hereby incorporated herein by reference, to the extent that they provide procedural or other details consistent with and supplementary to those set forth herein.

What is claimed is:

1. A method of forming an electrode on a surface, said method comprising:
   (a) applying a first non-solid current collector composition above the surface to form a first current collector layer above the surface;
   (b) applying a first non-solid electrode composition above the first current collector layer to form a first electrode layer above the first current collector layer;
   (c) applying a second non-solid current collector composition above the first electrode layer to form a three-dimensional current collector layer above the first electrode layer; and
   (d) applying a second non-solid electrode composition above the three-dimensional current collector layer to form a second electrode layer above the three-dimensional current collector layer,
   wherein the three-dimensional current collector layer surrounds the first current collector layer, the first electrode layer, and the second electrode layer.

2. The method of claim 1, wherein the three-dimensional current collector layer forms a web or grid around the first current collector layer, the first electrode layer, and the second electrode layer.

3. The method of claim 1, further comprising one or more compaction steps.

4. The method of claim 3, wherein the one or more compaction steps occur after applying the first non-solid electrode composition above the first current collector layer, after applying the second non-solid current collector composition above the first electrode layer, after applying the second non-solid electrode composition above the three-dimensional current collector layer, or combinations thereof.

5. The method of claim 1, wherein one or more of the applying steps are selected from the group consisting of spraying, brushing, rolling, printing, three-dimensional printing and combinations thereof.

6. The method of claim 1, wherein the three-dimensional current collector layer is formed above the first electrode layer by placing a stencil mask above the first electrode layer prior to applying the second non-solid current collector composition above the first electrode layer.

7. The method of claim 1, wherein the applying of the second non-solid current collector composition above the first electrode layer to form the three-dimensional current collector layer comprises at least one of webbing, controlled spraying, controlled inkjet printing, controlled screen printing, three-dimensional printing, sputtering, e-beam evaporation, and combinations thereof.

8. The method of claim 1,
wherein the first and second non-solid electrode compositions are anode electrode compositions that form anode electrode layers,
wherein the first and second non-solid current collector compositions are anode current collector compositions that form anode current collector layers, and
wherein the method results in the formation of an anode with an embedded three-dimensional current collector layer.

9. The method of claim 8, wherein the anode current collector compositions are selected from the group consisting of copper, nickel, titanium, and combinations thereof.

10. The method of claim 8, wherein the anode electrode compositions are selected from the group consisting of graphite, carbon materials, lithium titanium oxide ($Li_4Ti_5O_{12}$), silicon (Si), graphene, molybdenum sulfides, titanium oxide, tin (Sn), tin oxide, nitrides, and combinations thereof.

11. The method of claim 1,
wherein the first and second non-solid electrode compositions are cathode electrode compositions that form cathode electrode layers,
wherein the first and second non-solid current collector compositions are cathode current collector compositions that form cathode current collector layers, and
wherein the method results in the formation of a cathode with an embedded three-dimensional current collector layer.

12. The method of claim 11, wherein the cathode electrode compositions are selected from the group consisting of lithium cobalt oxide ($LiCoO_2$), lithium manganese oxide ($LiMn_2O_4$), lithium iron phosphate ($LiFePO_4$), vanadium oxide ($VO_2$), lithium nickel manganese cobalt oxide (NMC), lithium nickel cobalt aluminum oxide (NCA), and combinations of thereof.

13. The method of claim 11, wherein the cathode current collector compositions are selected from the group consisting of aluminum, iron, gold, silver, carbon nanotubes, graphene, conducting polymers, and combinations thereof.

14. The method of claim 1, wherein at least one of the first or second non-solid current collector compositions are selected from the group consisting of solvents, conductive nanomaterials, surfactants, and combinations thereof.

15. The method of claim 1, wherein at least one of the first or second non-solid electrode compositions are selected from the group consisting of polymers, solvents, conductive nanomaterials, and combinations thereof.

16. The method of claim 1, wherein the formed electrode is used as a component of a multilayer energy storage device, wherein the multilayer energy storage device is selected from the group consisting of capacitors, super capacitors, batteries, hybrids thereof, and combinations thereof.

17. The method of claim 16, wherein the multilayer energy storage device is a lithium ion battery.

18. The method of claim 1, wherein the surface is selected from the group consisting of glass, fabrics, metals, plastics, ceramics, and combinations thereof.

19. The method of claim 1, wherein the surface is heated prior to applying the first non-solid current collector composition above the surface.

20. The method of claim 19, wherein the surface is heated at temperatures between about 50° C. and about 150° C.

21. The method of claim 1, wherein the first non-solid current collector composition is applied above the surface multiple times to form a plurality of first current collector layers above the surface.

22. The method of claim 1, wherein the first non-solid electrode composition is applied above the first current collector layer multiple times to form a plurality of first electrode layers above the first current collector layer.

23. The method of claim 1, wherein the second non-solid current collector composition is applied above the first electrode layer multiple times to form a plurality of three-dimensional current collector layers above the first electrode layer.

24. The method of claim 1, wherein the second non-solid electrode composition is applied above the three-dimensional current collector layer multiple times to form a plurality of second electrode layers above the three-dimensional current collector layer.

25. The method of claim 1, wherein steps (b)-(d) are repeated multiple times to form multiple layers.

26. A method of forming an electrode on a surface, wherein the surface serves as a first current collector layer, said method comprising:
(a) applying a first non-solid electrode composition above the surface to form a first electrode layer above the surface;
(b) applying a second non-solid current collector composition above the first electrode layer to form a three-dimensional current collector layer above the first electrode layer; and
(c) applying a second non-solid electrode composition above the three-dimensional current collector layer to form a second electrode layer above the three-dimensional current collector layer,
wherein the three-dimensional current collector layer surrounds the surface, the first electrode layer, and the second electrode layer.

27. An electrode comprising:
(a) a first current collector layer;
(b) a first electrode layer above the first current collector layer;
(c) a three-dimensional current collector layer above the first electrode layer; and
(d) a second electrode layer above the three-dimensional current collector layer,
wherein the three-dimensional current collector layer surrounds the first current collector layer, the first electrode layer, and the second electrode layer.

28. The electrode of claim 27, wherein the three-dimensional current collector layer forms a web or grid around the first current collector layer, the first electrode layer, and the second electrode layer.

29. An energy storage device comprising an electrode, wherein the electrode comprises:
   (a) a first current collector layer;
   (b) a first electrode layer above the first current collector layer;
   (c) a three-dimensional current collector layer above the first electrode layer; and
   (d) a second electrode layer above the three-dimensional current collector layer,
   wherein the three-dimensional current collector layer surrounds the first current collector layer, the first electrode layer, and the second electrode layer.

30. The energy storage device of claim 29, wherein the energy storage device is a battery.

\* \* \* \* \*